(12) United States Patent
Carobolante et al.

(10) Patent No.: US 12,264,720 B2
(45) Date of Patent: Apr. 1, 2025

(54) ELASTIC LINK WITH DIFFERENT ELASTIC BEHAVIOR

(71) Applicant: SUMITOMO RIKO COMPANY LIMITED, Komaki (JP)

(72) Inventors: Pascal Carobolante, Sauvigny-les-bois (FR); Florian Kaszyca, Lucenay-lès-Aix (FR)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 206 days.

(21) Appl. No.: 17/945,989

(22) Filed: Sep. 15, 2022

(65) Prior Publication Data

US 2023/0109027 A1    Apr. 6, 2023

(30) Foreign Application Priority Data

Oct. 5, 2021 (FR) ........................................ 2110503

(51) Int. Cl.
*F16F 1/373* (2006.01)
*F16F 1/377* (2006.01)
*F16F 1/38* (2006.01)

(52) U.S. Cl.
CPC ............ *F16F 1/3732* (2013.01); *F16F 1/377* (2013.01); *F16F 2226/04* (2013.01)

(58) Field of Classification Search
CPC ........ F16F 1/3732; F16F 1/377; F16F 1/3863; F16F 2226/04; B60G 2204/41
See application file for complete search history.

(56) References Cited

U.S. PATENT DOCUMENTS

| | | | | |
|---|---|---|---|---|
| 3,831,920 A | * | 8/1974 | Meldrum .............. | F16F 3/0876 267/293 |
| 4,662,791 A | * | 5/1987 | Spicer ................... | E02B 17/003 267/121 |
| 4,936,556 A | * | 6/1990 | Makibayashi .......... | F16F 13/16 267/140.13 |
| 5,299,790 A | * | 4/1994 | Whightsil, Sr. ....... | F16F 1/3849 267/292 |

(Continued)

FOREIGN PATENT DOCUMENTS

| | | |
|---|---|---|
| CN | 105818666 A | 8/2016 |
| CN | 208530202 U | 2/2019 |

(Continued)

OTHER PUBLICATIONS

Search Report and Written Opinion mailed May 31, 2022 in French Patent Application No. 2110503 with partial English translation, 12 pages.

(Continued)

*Primary Examiner* — Thomas W Irvin
(74) *Attorney, Agent, or Firm* — Kim & Stewart LLP

(57) ABSTRACT

An elastic link comprising a first sleeve and a second sleeve. The first sleeve comprises a first elastic body, a first inner armature surrounded by the first elastic body, and a first outer armature surrounding the first elastic body. The second sleeve comprises a second elastic body, a second inner armature surrounded by the second elastic body, and a second outer armature surrounding the second elastic body. The first elastic body and the second elastic body presenting different elastic behaviors. This constitutes an improved elastic link.

20 Claims, 8 Drawing Sheets

(56) References Cited

U.S. PATENT DOCUMENTS

| | | | | |
|---|---|---|---|---|
| 6,663,090 B2* | 12/2003 | Simuttis | | F16F 13/18 |
| | | | | 267/140.13 |
| 6,953,187 B2* | 10/2005 | Groth | | F16F 1/3935 |
| | | | | 267/141.1 |
| 7,506,862 B2* | 3/2009 | Siemer | | B60G 7/02 |
| | | | | 267/293 |
| 8,037,573 B2* | 10/2011 | Bost, Jr. | | B60G 3/20 |
| | | | | 16/2.2 |
| 8,579,510 B2* | 11/2013 | Noble | | F16F 1/3842 |
| | | | | 384/129 |
| 8,973,909 B2* | 3/2015 | Noble | | B60G 9/00 |
| | | | | 267/293 |
| 9,506,517 B2* | 11/2016 | Cha | | F16F 1/3863 |
| 11,320,014 B2 | 5/2022 | Gendron et al. | | |
| 11,572,927 B2 | 2/2023 | Lee | | |
| 11,577,569 B2* | 2/2023 | Gaspar | | F16F 1/3863 |
| 11,685,209 B2* | 6/2023 | Jo | | B29C 45/14311 |
| | | | | 428/138 |
| 11,719,300 B2* | 8/2023 | Carobolante | | F16C 11/0685 |
| | | | | 267/140.11 |
| 12,025,180 B2* | 7/2024 | Johnston | | F16C 33/046 |
| 2006/0012092 A1* | 1/2006 | Siemer | | B60G 7/02 |
| | | | | 267/141 |
| 2009/0249581 A1* | 10/2009 | Bost, Jr. | | B60G 3/20 |
| | | | | 16/2.1 |
| 2011/0222803 A1* | 9/2011 | Noble | | F16F 1/3842 |
| | | | | 29/898.054 |
| 2012/0175831 A1* | 7/2012 | Kieffer | | F16F 1/3814 |
| | | | | 29/530 |
| 2016/0052357 A1* | 2/2016 | Cha | | F16F 1/3863 |
| | | | | 29/896.91 |
| 2018/0135716 A1* | 5/2018 | Zimmerman | | F16F 1/3842 |
| 2021/0164531 A1* | 6/2021 | Gendron | | B60K 5/1208 |
| 2022/0364623 A1* | 11/2022 | Bixler | | F16F 1/3835 |
| 2022/0364624 A1* | 11/2022 | Carobolante | | F16F 1/387 |

FOREIGN PATENT DOCUMENTS

| | | |
|---|---|---|
| CN | 112824214 A | 5/2021 |
| DE | 102017009679 A1 | 4/2019 |
| EP | 2180203 A2 | 4/2010 |
| KR | 91-20340 A | 12/1991 |
| KR | 92-4705 Y1 | 7/1992 |
| WO | 2019/202217 A1 | 10/2019 |

OTHER PUBLICATIONS

First Office Action mailed Jan. 16, 2025 in Chinese Patent Application No. 202211157889.5 with machine translation, 12 pages.

* cited by examiner

[Fig 1]
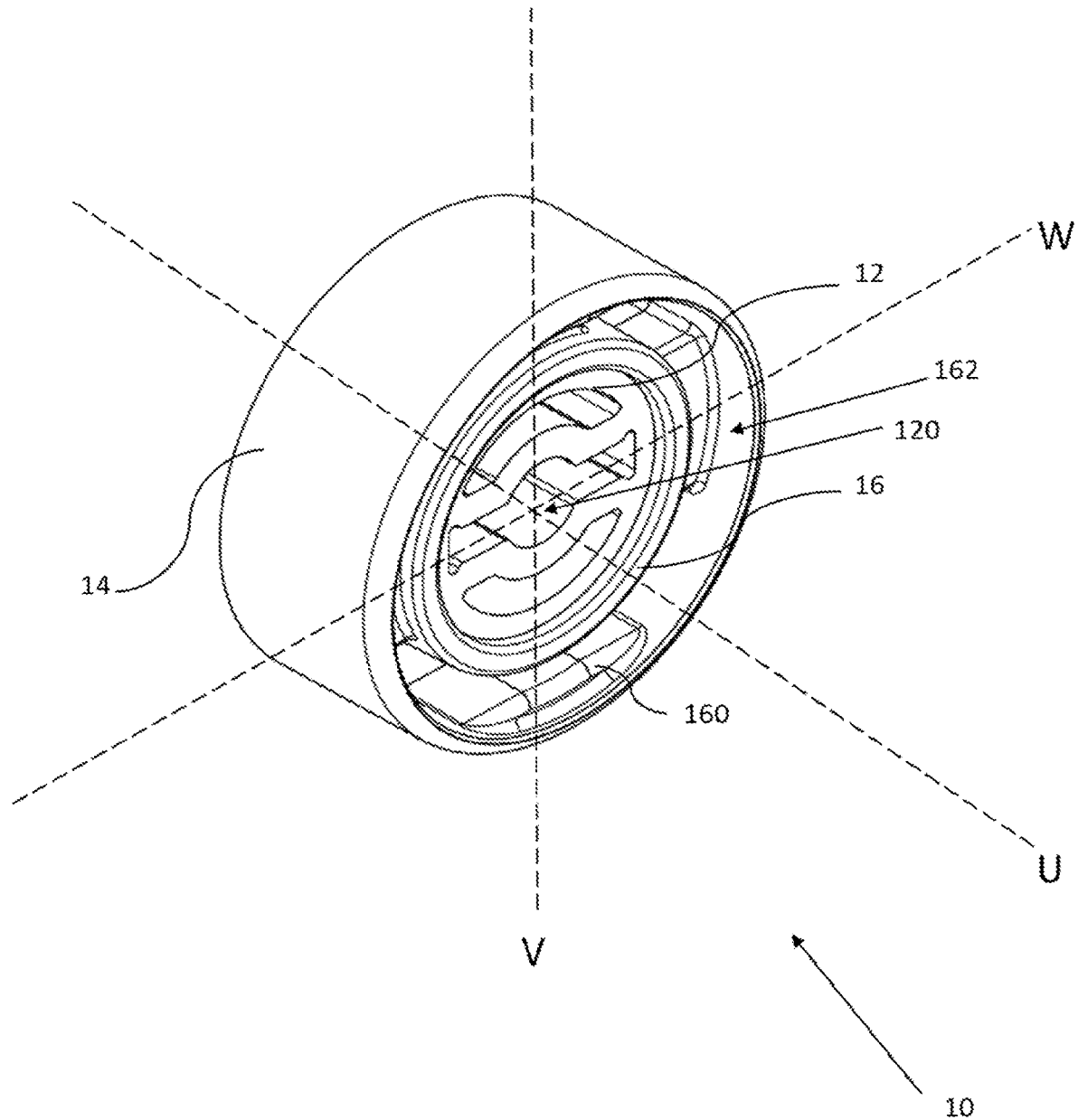

[Fig 2]
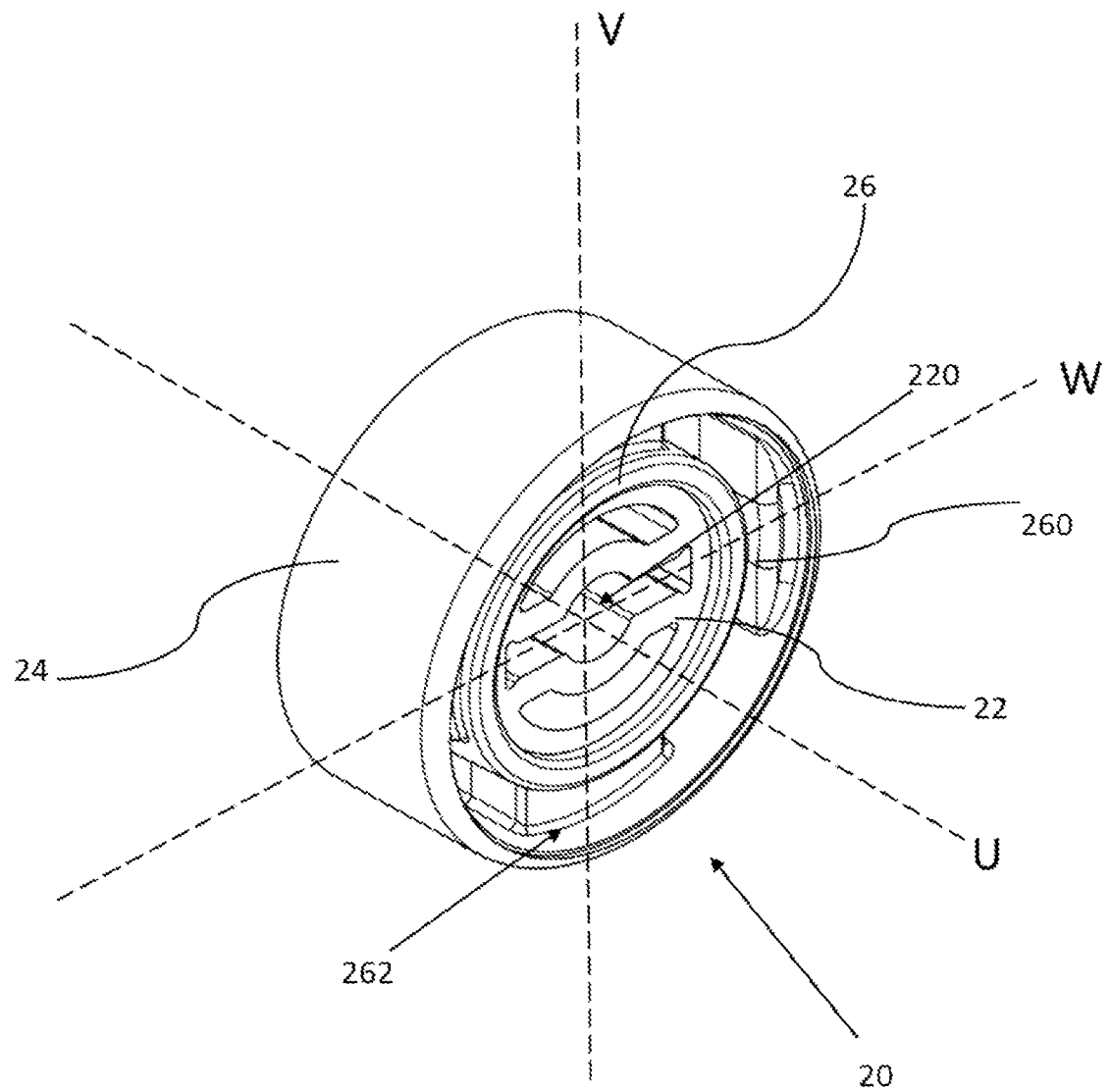

[Fig 3]
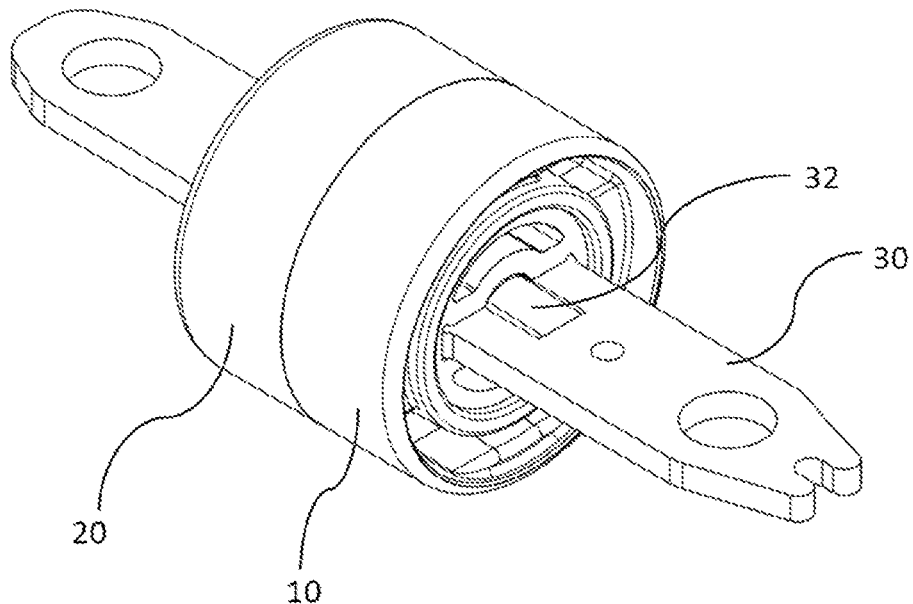
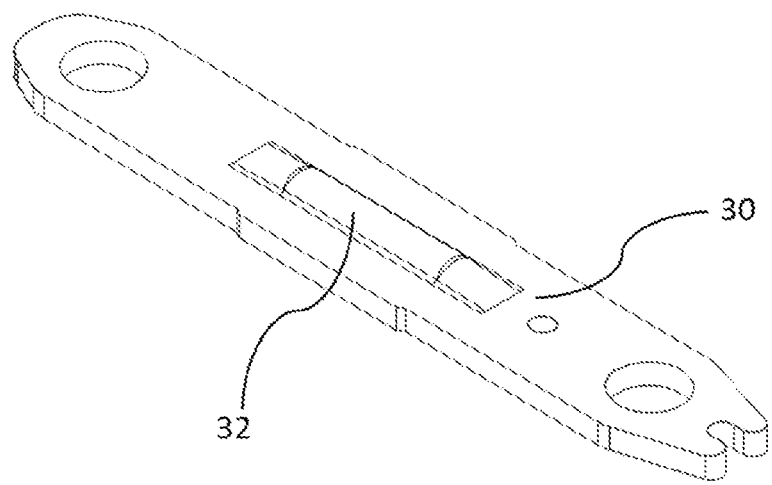

[Fig 4A]
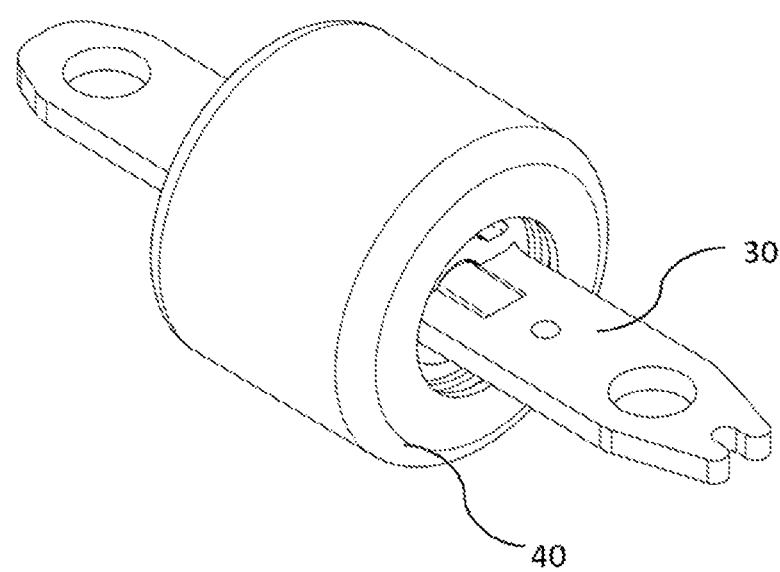

[Fig 4B]
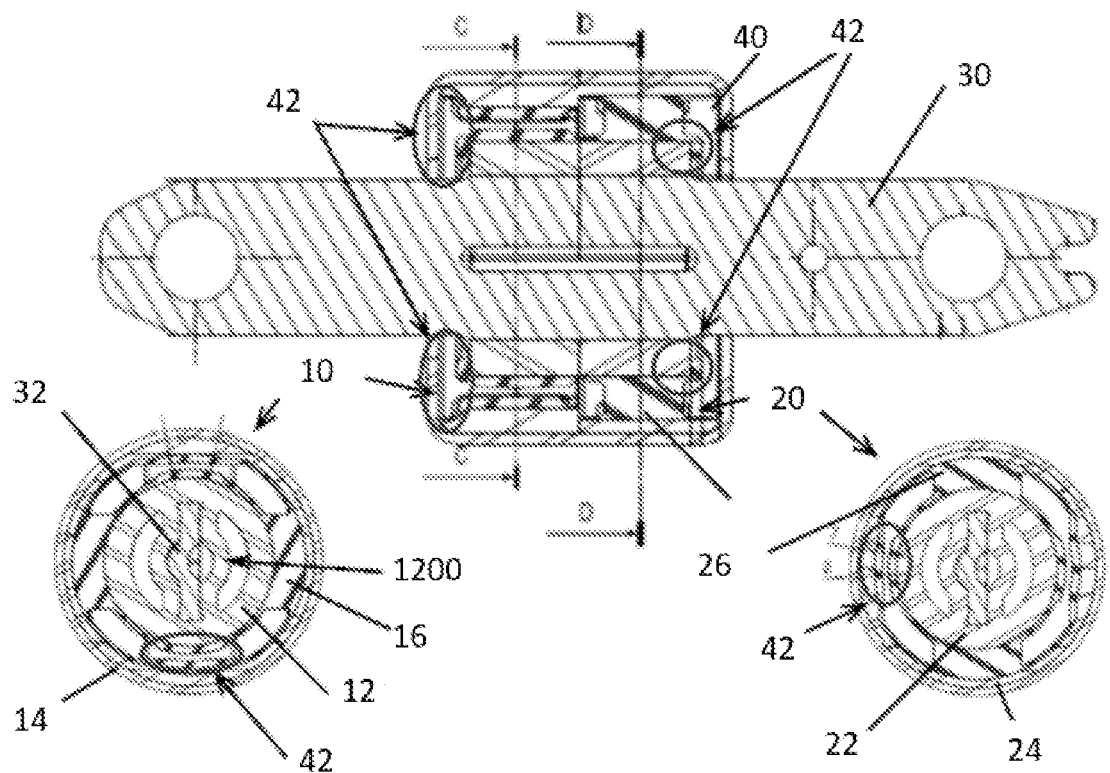

[Fig 5]
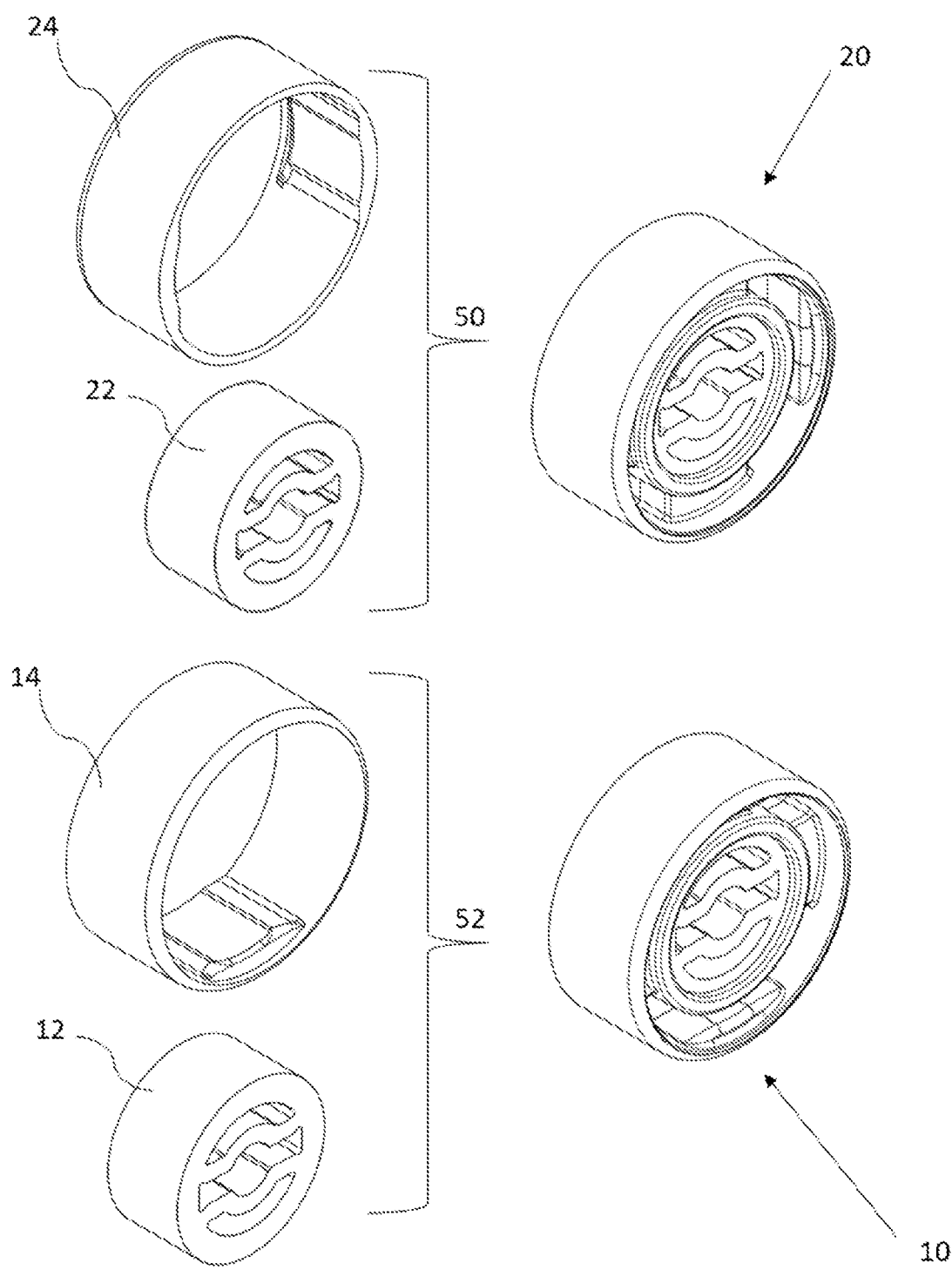

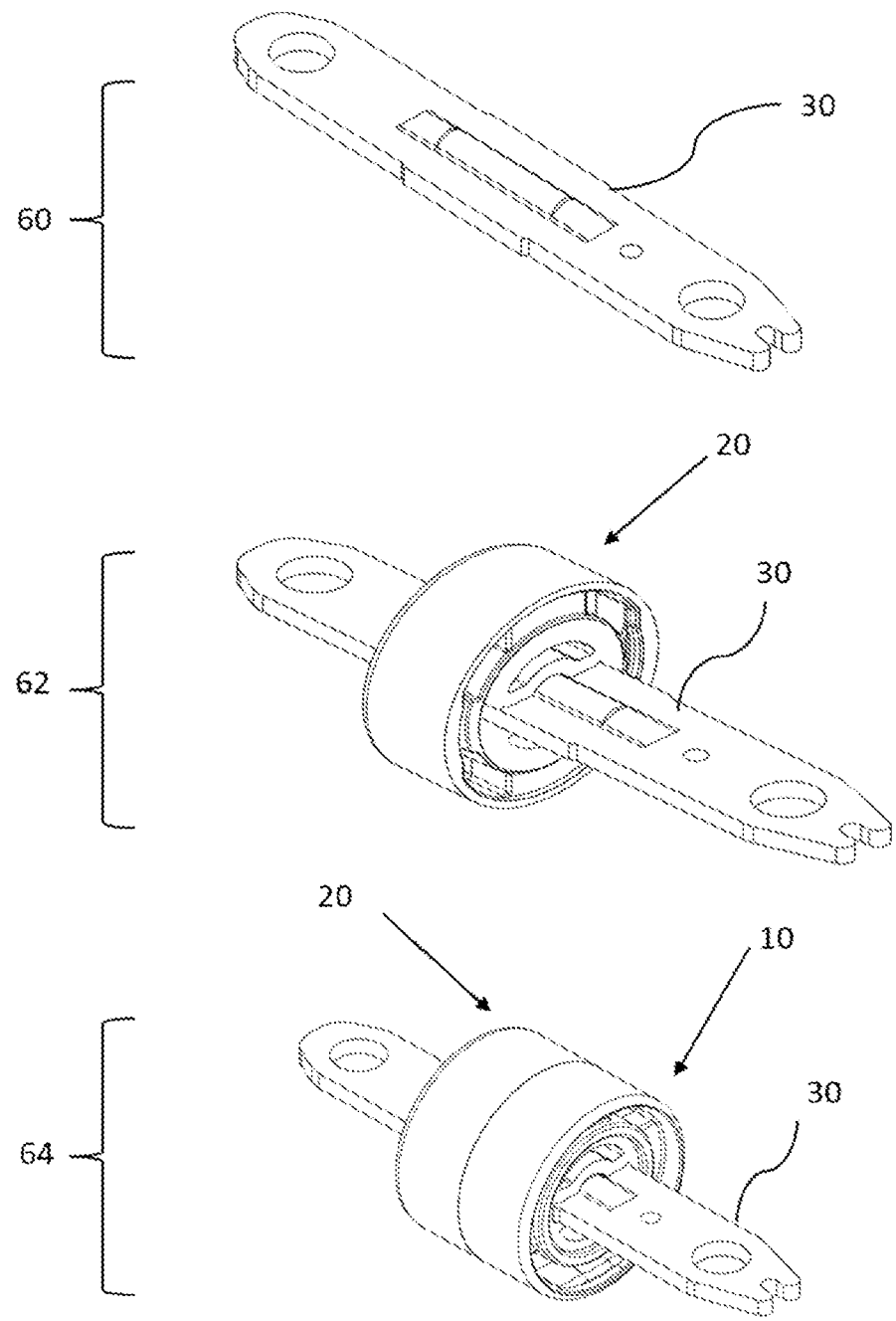

[Fig 7]
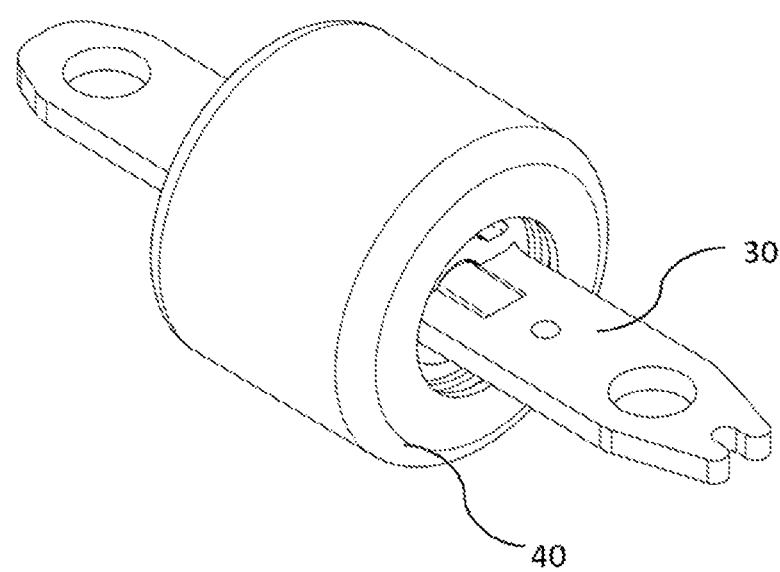

ELASTIC LINK WITH DIFFERENT ELASTIC BEHAVIOR

This application is based upon and claims the benefit of priority from French Patent Application No. 2110503, filed Oct. 5, 2021, the entire contents of which are incorporated herein by reference.

The present disclosure relates to the field of elastic links, for example elastic links for vehicles (for example, cars or trucks).

Elastic links may be used to absorb and/or dampen vibrations and/or shocks between mechanical parts forming part of the same assembly. Such links may be used in particular in the automotive sector to connect different mechanical parts of a vehicle.

Existing links are manufactured using complex methods and/or requiring very specific and/or expensive tools, such as a bi-material and bi-injection part, to mold an elastic body in order to give it different elastic properties according to different directions.

In this context, there is a need for an improved elastic link.

For this purpose, an elastic link is proposed comprising a first sleeve and a second sleeve. The first sleeve comprises a first elastic body, a first inner armature surrounded by the first elastic body, and a first outer armature surrounding the first elastic body. The second sleeve comprises a second elastic body, a second inner armature surrounded by the second elastic body, and a second outer armature surrounding the second elastic body. The first elastic body and the second elastic body exhibit different elastic behaviors.

According to a first option, the first elastic body is more damping than the second elastic body according to a first radial direction relative to an axis of the link, and the second elastic body is more resilient than the first elastic body according to a second radial direction relative to the axis.

In particular according to this first option, the first elastic body may present a greater damping than the second elastic body, for example greater than 1.5 times the damping of the second elastic body. Optionally, the first elastic body presents a damping between 0.10 and 0.24 according to the first radial direction, for example of the order of 0.14. Additionally, or alternatively, the second elastic body presents a damping between 0.04 and 0.11 according to the second radial direction, for example of the order of 0.07.

Additionally or alternatively according to this first option, the link may be an elastic link for a vehicle, the first radial direction being a direction of travel of the vehicle, the second radial direction being a vertical of the vehicle.

Still additionally or alternatively according to this first option, the first elastic body may comprise one or more end-of-stroke stops according to the second radial direction, and the second elastic body may comprise one or more end-of-stroke stops according to the first radial direction.

Even additionally or alternatively according to this first option, the first elastic body and the second elastic body may present substantially identical shapes, the first radial direction and the second radial direction being substantially orthogonal.

According to a second additional or alternative option to the first option, the link further comprises a housing that integrates the first sleeve and the second sleeve.

According to a third option, additional or alternative to the first and/or second options, the link further comprises a means for securing the first sleeve and the second sleeve assembly together, for example comprising a connector, such as a blade, inserted into a central passage of the first inner armature and into a central passage of the second inner armature.

Also proposed is a method for manufacturing the elastic link. The method comprises providing and positioning the first inner armature and the first outer armature. The method comprises providing and positioning the second inner armature and the second outer armature. The method further comprises molding the first elastic body between the first inner armature and the first outer armature, so as to obtain the first sleeve. The method further comprises molding the second elastic body between the second inner armature and the second outer armature, so as to obtain the second sleeve. The method further comprises assembling the first sleeve and the second sleeve.

Also proposed is a method for manufacturing an elastic link as described above. The method comprises providing and positioning the first inner armature and first outer armature, and the second inner armature and second outer armature. The method also comprises molding the first elastic body between the first inner armature and first outer armature, so as to obtain the first sleeve, and the second elastic body between the second inner armature and second outer armature, so as to obtain the second sleeve. The method also comprises assembling the first sleeve and the second sleeve.

According to one example, assembling the first sleeve and the second sleeve comprises implementing a means for connecting the first sleeve and the second sleeve together. This implementation may consist of crimping a housing around the first sleeve and the second sleeve, and/or inserting a connector, such as a blade, into a central passage of the first inner armature and into a central passage of the second inner armature.

FIG. 1 illustrates the first sleeve of an example of the elastic link.

FIG. 2 illustrates the second sleeve of the example elastic link.

FIG. 3 illustrates the two sleeves assembled in the example link.

FIG. 4A illustrates a housing that surrounds the two sleeves of the example link.

FIG. 4B shows a cross-sectional view of the example link.

FIG. 5 illustrates the provision and positioning of the inner armature and outer armature, and the molding of the elastic body between the armatures, in an example of the method for manufacturing the example elastic link of FIGS. 1 to 4.

FIG. 6 illustrates the assembly of the sleeves in the example method of manufacturing.

FIG. 7 illustrates the crimping of the housing around the sleeves in the example method of manufacturing.

An elastic link is proposed comprising a first sleeve and a second sleeve. The first sleeve comprises a first elastic body, a first inner armature surrounded by the first elastic body, and a first outer armature surrounding the first elastic body. The second sleeve comprises a second elastic body, a second inner armature surrounded by the second elastic body, and a second outer armature surrounding the second elastic body. The first elastic body and the second elastic body present different elastic behaviors.

This constitutes an improved elastic link.

Indeed, due to its structure of two separate sleeves, the elastic bodies of which presenting different elastic behaviors, the elastic link may be manufactured using a single material injection molding machine, which simplifies manufacturing. The two elastic bodies may be molded separately, thus each elastic body may be completely formed but separated from the other elastic body. This avoids the need for a bi-injection press (or bi-material press). In other words, the proposed elastic link is an elastic link with a bi-material effect but may be obtained without using a bi-injection press. Furthermore, the two elastic bodies may be molded separately. These separate moldings allow for optimized vulcanization parameters for each of the two sleeves, which is more difficult to achieve with a bi-injection press. It is thus possible to mold the two elastic bodies separately and then assemble them so that each body comprises one or more end-of-stroke stops for the other body. This eliminates the need for additional parts to perform the function of these stops, as the stops may be formed directly on the elastic bodies during their molding.

Each of the two sleeves comprises at least two armatures: an inner armature and an outer armature. Optionally, each of the two sleeves or one of the two sleeves may further comprise an intermediate armature. Each inner armature is a part made of a rigid material, for example a metal or alloy or plastic. Each outer armature is also a part made of a rigid material, for example a metal or alloy or plastic. Each outer armature may have a generally tubular shape (e.g., circular cross-section or otherwise). For example, each outer armature may have a generally ring or collar shape. Each inner armature may have a generally extruded shape (that is, corresponding to an extrusion according to an axis, and therefore of generally constant cross-section perpendicular to the axis along the axis). Alternatively, the inner armature is not extruded, and may for example be cold formed, molded and thus of any shape. The outer housing of each inner armature may present the shape of a prism, for example a cylinder. Each inner armature may comprise a central passage able to receive a means of attachment to the inner armature of the other sleeve, for example a blade. Alternatively, the first inner armature and the second inner armature may have complementary interlocking shapes so that they may be connected to each other without additional fastening means (that is, without an additional part serving as a connecting means). Alternatively, or additionally, the first outer armature and the second outer armature may have complementary interlocking shapes so that they may be connected to each other without additional connecting means.

The first elastic body is surrounded by the first outer armature and surrounds the first inner armature. The first elastic body may be obtained by molding, for example with a single injection molding machine, and may be bonded to the first outer armature and the first inner armature so that the first elastic body, the first inner armature, and the first outer armature are integral. For example, the first elastic body may be molded between the first inner armature and the first outer armature, and the molding may comprise a bonding so that the first inner armature and the first outer armature are bonded to the first elastic body.

Similarly, the second elastic body is surrounded by the second outer armature and surrounds the second inner armature. The second elastic body may be obtained by molding, for example, with a single injection molding machine, and may be bonded to the second outer armature and the second inner armature, such that the second elastic body, the second inner armature, and the second outer armature are integral. For example, the second elastic body may be molded between the second inner armature and the second outer armature, and the molding may comprise a bonding so that the second inner armature and the second outer armature are bonded to the second elastic body.

The first elastic body and the second elastic body may or may not have generally similar shapes. They are both made of an elastic material, such as rubber, but present different elastic behaviors in the link. For example, the first elastic body may be more damping than the second elastic body according to a first radial direction relative to an axis of the link. In turn, the second elastic body may be more resilient than the first elastic body according to a second radial direction relative to the axis. The two elastic bodies may, for example, be manufactured from different materials and/or present different properties (for example, rubbers of different compositions and/or structured differently). The composition of the material from which the first elastic body is manufactured, may, for example, be different to that of the material from which the second elastic body is manufactured. Alternatively, or additionally, the material making up the first elastic body may present a structure, for example an arrangement of cells and/or cavities, different from the structure, for example, the arrangement of cells and/or cavities, of the material making up the second elastic body, for example these materials may furthermore be the identical or different in their compositions. Alternatively, the material of the two elastic bodies may be identical in their structure and/or composition, but the elastic bodies may be arranged in different ways in the link (for example, (that is, in rotation, for example by 90°, relative to each other according to the axis of the link), so as to present different elastic behavior according to one or more radial directions (that is, relative to the axis); in other words, for each respective radial direction of the one or more radial directions, the elastic behavior of the two elastic bodies is different according to the respective radial direction.

The axis of the link is an axis according to which the first and second sleeves are positioned, so that the elastic bodies have specific elastic behaviors in directions radial to the axis of the link. The first and second sleeves may, for example, have generally prismatic (for example, cylindrical) shapes, in which case the axis may be the principal direction of that prismatic shape (for example, may substantially correspond to an axis of revolution in the cylindrical case). For example, when the link is an elastic vehicle link, the axis may be a lateral or substantially lateral direction of the vehicle, for example a direction parallel or substantially parallel to the axis of rotation of the wheels.

The first radial direction and the second radial direction are directions substantially perpendicular to the axis of the link. The first elastic body may be more damping than the second elastic body according to the first radial direction, that is, the link dampens/absorbs the shocks and/or the impacts according to the first radial direction, due to the damping of the first elastic body. The second elastic body may be more resilient than the first elastic body according to the second radial direction, in that, the link dampens/absorbs noise and/or vibration according to the second radial direction, due to the resilience of the second elastic body. The resilience of the second elastic body allows energy dissipation to be reduced and avoids dynamic hardening. Dynamic hardening increases stiffness, which increases vibration. Conversely, the damping of the first elastic body increases the dynamic stiffness. Thus, the first elastic body better absorbs shocks according to the first radial direction, while the second elastic body prevents the propagation of noise and/or vibration in the second radial direction. Furthermore, the stiffness according to the first and second directions are thus independent.

The elastic link may be a vehicle elastic link, for example a link mounted on a torsional train (or H-train). In this context, one may seek to avoid dynamic stiffening (resilient mixture) in the direction of the passenger compartment, as this favors the rise of noise and/or vibrations. Also, one may seek to be able to dampen shocks in the direction of travel of the vehicle. In this example, the first radial direction is a direction of travel of the vehicle, for example a front-rear direction or substantially parallel to (for example, forming an angle of less than 30° with) the front-rear direction. Thus, the first elastic body, being more damping than the other according to this direction, dampens/absorbs shocks and/or impacts that may occur when the vehicle is running and moving (for example, due to obstacles, potholes and/or speed bumps). The second radial direction is a vertical direction of the vehicle, in other words, a direction perpendicular to the direction of travel and directed towards the passenger compartment of the vehicle. Thus, the second elastic body, which is more resilient than the first, dampens/absorbs the noise and/or vibration that travels up towards the passenger compartment of the vehicle when the vehicle is running.

The first elastic body may present a greater damping than the second elastic body, for example greater than 1.5 times (one and a half times) the damping of the second elastic body. In this case, the first elastic body may present a damping between 0.10 and 0.24 according to the first radial direction, for example of the order of 0.14, for example equal to 0.14. Alternatively, or additionally, the second elastic body may present a damping between 0.04 and 0.11 according to the second radial direction, for example of the order of 0.07, for example equal to 0.07. The damping may also be referred to as damping factor, or tangent delta ($\tan(\delta)$), or tangent phi ($\tan(\varphi)$).

The first elastic body may comprise one or more end-of-stroke stops (for example, two stops) according to the second radial direction, in other words, one or more end-of-stroke stops for the second elastic body. Each stop may be formed by an excess thickness of the elastic body, for example forming a protrusion on the elastic body. The first elastic body may, for example, present one or more excess thickness protrusions according to the second radial direction opposite one or more depressions (in other words, material-free areas) of the second elastic body, for example, a respective protrusion facing each depression. Each protrusion fits into the facing depression, so as to allow the second elastic body to begin a stroke according to the second radial direction, until the second elastic body abuts the corresponding protrusion of the first elastic body, this protrusion thus forming an end-of-stroke stop for the second elastic body.

The second elastic body may comprise one or more end-of-stroke stops (for example two stops) according to the first radial direction, in other words, one or more end-of-stroke stops for the first elastic body. The second elastic body may, for example, present one or more excess thickness protrusions according to the first radial direction opposite one or more depressions (in other words, material-free areas) of the first elastic body, for example, one respective protrusion facing each depression. Each protrusion fits into the facing depression, so as to allow the first elastic body to begin a stroke according to the first radial direction, until the first elastic body abuts the corresponding protrusion of the second elastic body, this protrusion thus forming an end of stroke stop for the first elastic body.

Each end-of-stroke stop may thus correspond to a thickening of the elastic body in the form of a protrusion on this elastic body and may be accommodated in a depression in the other elastic body, opposite the protrusion. The stops allow to limit the strokes. They allow to saturate the rigidity at the end of the stroke, outside a central part of the stroke.

Thus, the first elastic body and the second elastic body may have substantially complementary shapes, each body having one or more end-of-stroke stops in the direction of stroke of the other body. For example, as described above, each stop of one body may form a protrusion that fits into a depression in the other body, facing the depression. In addition, the stops are made in the elastic bodies, in that the end stops comprised in the first (resp. second) elastic body are part of the first (resp. second) elastic body and are therefore made of the same material. This allows for simple manufacturing and continuity of stiffness, in that there is no sudden change in stiffness at the end of the stroke of the first or second elastic body. In the case of a vehicle in particular (in other words, when the elastic link is for a vehicle), this avoids sudden changes in stiffness and improves comfort, especially in the event of a major impact. Moreover, as the stops are part of the elastic bodies, it is not necessary to add any specific part having the role of stop(s), which greatly simplifies the manufacturing.

The first elastic body and the second elastic body may present substantially identical shapes, the first radial direction and the second radial direction being substantially orthogonal. The end-of-stroke stops of the two elastic bodies are thus arranged on substantially orthogonal axes, in that, the end-of-stroke stops included in the first elastic body are on an axis (the second radial direction) substantially orthogonal to the axis (the first radial direction) on which the end-of-stroke stops included in the second elastic body are located. The first elastic body and the second elastic body may thus be made with the same single material injection press, with substantially the same settings for the shape and dimensions of the parts to be molded, but then mounted (for example, bonded to the armatures) so as to be rotated 90° relative to each other according to the axis of the link. This ensures that the end-of-stroke stops in each body are located in the direction of travel of the other body. This allows a particularly simple manufacture of the elastic bodies and their stop(s) and avoids the addition of a specific part having the role of stop(s), which greatly simplifies the manufacture.

The first sleeve and the second sleeve are integral. In other words, the link comprises a means for making the first sleeve and the second sleeve integral. For example, the link may further comprise a housing that integrates the first sleeve and the second sleeve. This housing enables, or contributes to, securing the first sleeve and the second sleeve together. The housing fixes the sleeves in translation. The housing thus facilitates assembly and may also be used to add an additional stop function. The housing may be made of aluminum and/or steel, for example cataphoretic and/or zinc-plated or others, and/or plastic.

The link may further comprise a means for securing the first sleeve and the second sleeve together. This means may secure the sleeves rotationally and/or translationally. The means may comprise a connector inserted into the inner armatures. More specifically, the connector is a part (for example, of metal such as steel), such as a blade (e.g., of metal such as steel), inserted (for example, forced) into a central passage of the first inner armature and into a central passage of the second inner armature. The connector inserted into the inner armatures secures the two sleeves in rotation. The connector and the inner armatures may also present such a friction and/or arrangement that the inserted connector additionally secures the two sleeves in translation. Alternatively, or additionally, this means may comprise the previously discussed housing that secures the sleeves in translation. The housing may be present in addition to the connector inserted into the inner armatures, so as to cooperate with the latter to secure the sleeves. Thus, in this case, the housing secures the sleeves in translation while the connector inserted into the inner armatures secures them in rotation. Alternatively, the means of securing the sleeves together may not comprise the connector inserted into the inner armatures. In this case, instead of having the connector inserted into the inner armature, the two inner armatures may present complementary shapes so as to interlock with each other. Additionally, or alternatively, the two outer armatures may present complementary shapes so as to interlock with each other. These complementary shapes allow the sleeves to be secured in rotation. As a further alternative, the link may comprise the connector inserted into the inner armatures and the inner and/or outer armatures may also have complementary shapes. In this case, the link may or may not comprise the housing.

An example of the elastic link will now be described with reference to FIGS. 1 through 4B. The elastic link in this example may be used in a vehicle. In these figures, the U axis is the axis of the link, with the V and W axes being the radial directions.

FIG. 1 shows the first sleeve 10 of the link. The first sleeve 10 comprises the first elastic body 16. The first elastic body 16 surrounds the first inner armature 12, which comprises a central passage 120, and is surrounded by the first outer armature 14. The first elastic body 16 is molded between the first inner armature 12 and the first outer armature 14, wherein the molding may comprise bonding the first elastic body 16 to the armatures 12 and 14. The first elastic body 16 comprises two depressions 162 according to the first radial direction W (only one of which is visible in the figure). By "according to", it is meant that the two depressions 162 are located on the axis that corresponds to the first radial direction W, on either side of the inner armature 12. The two depressions 162 are symmetrical relative to the second radial direction V. The first elastic body 16 also comprises two protrusions 160 according to the second radial direction V (only one being visible in the figure). By "according to", it is meant that the two protrusions 160 are located on the axis that corresponds to the second radial direction V, on either side of the inner armature 12. The two protrusions 160 are symmetrical relative to the first radial direction W. Each protrusion 160 forms an end-of-stroke stop according to the second radial direction V, in other words, an end-of-stroke stop for the second elastic body.

FIG. 2 shows the second sleeve 20 of the link. The second sleeve 20 comprises the second elastic body 26. The second elastic body 26 surrounds the second inner armature 22, which comprises a central passage 220, and is surrounded by the second outer armature 24. The second elastic body 26 is molded between the second inner armature 22 and the second outer armature 24, wherein the molding may comprise bonding the second elastic body 26 to the armatures 22 and 24. The second elastic body 26 comprises two depressions 262 according to the second radial direction V (only one of which is visible in the figure). By "according to", it is meant that the two depressions 262 are located on the axis that corresponds to the second radial direction V, on either side of the inner armature 22. The two depressions 262 are symmetrical relative to the first radial direction W. The second elastic body 26 also includes two protrusions 260 (only one being visible in the figure) according to the first radial direction W. By "according to", it is meant that the two protrusions 260 are located on the axis that corresponds to the first radial direction W, on either side of the inner armature 22. The two depressions 260 are symmetrical relative to the second radial direction V. Each protrusion 260 forms an end-of-stroke stop according to the first radial direction W, in other words, an end-of-stroke stop for the first elastic body.

As can be seen in FIGS. 1 and 2, the radial directions V and W are substantially orthogonal. The depressions 262 of the second sleeve 20 are according to the second radial direction V, facing the protrusions 160 of the first sleeve 10, they too, being according to the second radial direction V. The depressions 162 of the first sleeve 10 are according to the first radial direction W, facing the stops 260 of the second sleeve 20, they too, being according to the first radial direction W. The protrusions 160 thus form end-of-stroke stops according to the second radial direction V, in other words, end-of-stroke stops for the second elastic body 26. Similarly, the protrusions 260 form end-of-stroke stops according to the first radial direction W, in other words, end stops for the first elastic body 16. As can be seen in FIGS. 1 and 2, the elastic bodies 16 and 26 have generally complementary and substantially identical shapes. They are arranged in the link to rotate substantially 90° relative to each other according to the U axis of the link, so that the stop protrusions of one are facing the depressions of the other, and vice versa. As seen in FIGS. 1 and 2, the central passages 120 and 220 are aligned. This allows for the insertion of a connector such as a blade through the central passages of both sleeves.

FIG. 3 shows the two sleeves 10 and 20 assembled in the link and made rotationally integral by a connector, which in this case is a blade 30 inserted through the central passages 120 and 220. The blade 30 is also shown separately in FIG. 3. The blade 30 has a convex portion 32 that engages a recessed portion of the central passages 120 and 220, thereby securing the blade to both inner armatures 12 and 22. The convex portion and the recessed portion are complementary and fitted, so that once the blade is inserted into the recessed portion, it is securely fixed there.

FIG. 4A shows a housing 40 that surrounds the two sleeves 10 and 20, thus making them translationally integral. The two ends of the housing 40 form radially inwardly bent inner flanges. The inner flanges are provided with axial stops respectively for one end of the first inner armature and the other end of the second inner armature. FIG. 4B shows a cross-sectional view of the link and in particular the housing, including the axial stops 42. The depressed portion 1200 is also shown there.

The method for manufacturing the elastic link is now discussed.

The manufacturing method comprises the providing and positioning of the first inner armature and the first outer armature, and the providing and positioning of the second inner armature and the second outer armature. These operations may be done one after the other, that is, one outer and one inner armature are positioned, then the molding of one elastic body between these armatures is done, then the other outer armature and the other inner armature are positioned, and the molding of the other elastic body between these armatures is done. In this case, both moldings may be made with the same injection molding machine, which is a particularly simple manufacturing process.

The manufacturing method further comprises molding the first elastic body between the first inner armature and the first outer armature, so as to obtain the first sleeve, as well as molding the second elastic body between the second inner armature and the second outer armature, so as to obtain the second sleeve.

Optionally, the molding may further comprise bonding the inner and/or outer armatures. In other words, the molding of each elastic body may comprise for each sleeve a pre-treatment of the outer surface of the inner armature and/or the inner surface of the outer armature, prior to the molding, the pre-treatment comprising a bonding of the inner and/or outer armatures with specific adhesives. The bonding allows the creation of bonds between the armature and the elastic body during the vulcanization that takes place during the molding.

The method then comprises the assembly of the first sleeve and the second sleeve.

The assembling may comprise the implementation of a means for securing the first sleeve and the second sleeve together. Implementation of the means for securing the first sleeve and the second sleeve together may comprise crimping a housing around the first sleeve and the second sleeve. Alternatively, or additionally, implementation of the means for securing the first sleeve and the second sleeve together may comprise inserting (for example forcing) a connector (that is, a part, for example, made of metal such as steel), such as a blade, through a central passage of the first inner armature and a central passage of the second inner armature. Alternatively, or additionally, the implementation of the means for securing the first sleeve and the second sleeve together may comprise an interlocking assembly of the two inner and/or two outer armatures. In this case, the two inner fittings and/or the two outer fittings have complementary shapes so as to interlock, in other words, the two inner fittings interlock and/or the two outer fittings interlock.

An example of the manufacturing method will now be described with reference to FIGS. 5 to 7. In particular, the figures illustrate the manufacture of the example elastic link described with reference to FIGS. 1 to 4.

As shown by FIG. 5, the method comprises providing and positioning the inner armature 22 and the outer armature 24, and molding 50 the elastic body 26 (see FIGS. 1 to 4) between the armatures 22 and 24, so as to obtain the sleeve 20. The molding is performed by means of a single material injection press. The method further comprises providing and positioning the inner armature 12 and the outer armature 14, and molding 52 the elastic body 16 (see FIGS. 1 to 4) between the armatures 12 and 14, so as to obtain the sleeve 10. The molding is done by means of a single material injection press.

As shown in FIG. 6, the method then comprises assembling the sleeves 10 and 20. The assembly comprises providing 60 the blade 30, then inserting 62 the blade 30 into the sleeve 20, then inserting 64 the blade 30 into the sleeve 10. Alternatively, the blade may be inserted into the sleeve 10 and then into the sleeve 20.

As illustrated in FIG. 7, the method then comprises crimping the housing 40 around the sleeves 10 and 20.

What is claimed is:

1. An elastic link, comprising:
   a first sleeve, comprising a first elastic body, a first inner armature surrounded by the first elastic body, and a first outer armature surrounding the first elastic body, and
   a second sleeve, comprising a second elastic body, a second inner armature surrounded by the second elastic body, and a second outer armature surrounding the second elastic body,
   the first elastic body and the second elastic body presenting different elastic behaviors, wherein a damping of the first elastic body in a first radial direction relative to a link axis is greater than a damping of the second elastic body in the first radial direction relative to the link axis, and a resilience of the second elastic body in a second radial direction relative to the link axis is greater than a resilience of the first elastic body in the second radial direction relative to the link axis.

2. The link according to claim 1, wherein:
   the damping of the first elastic body in the first radial direction relative to the link axis is greater than the damping of the second elastic body in the second radial direction relative to the link axis.

3. The link according to claim 2, wherein the damping of the first elastic body in the first radial direction relative to the link axis is greater than 1.5 times the damping of the second elastic body in the second radial direction relative to the link axis.

4. The link according to claim 3, wherein
   the damping of the first elastic body in the first radial direction relative to the link axis is between 0.10 and 0.24, and
   the damping of the second elastic body in the second radial direction relative to the link axis is between 0.04 and 0.11.

5. The link according to claim 4, wherein
   the damping of the first elastic body in the first radial direction relative to the link axis is 0.14, and
   the damping of the second elastic body in the second radial direction relative to the link axis is 0.07.

6. The link according to claim 2, wherein the link is an elastic link for a vehicle, the first radial direction being a direction of travel of the vehicle, the second radial direction being a vertical of the vehicle.

7. The link of claim 2, wherein:
   the first elastic body comprises one or more end-of-stroke stops in the second radial direction, and
   the second elastic body comprises one or more end-of-stroke stops in the first radial direction.

8. The link according to claim 1, wherein the first radial direction and the second radial direction are substantially orthogonal.

9. The link according to claim 1, wherein the link further comprises a housing that integrates the first sleeve and the second sleeve.

10. The link according to claim 1, wherein the link further comprises a means for securing the first sleeve and the second sleeve together.

11. A method for manufacturing an elastic link, the elastic link comprising:
    a first sleeve, comprising a first elastic body, a first inner armature surrounded by the first elastic body, and a first outer armature surrounding the first elastic body, and
    a second sleeve, comprising a second elastic body, a second inner armature surrounded by the second elastic body, and a second outer armature surrounding the second elastic body,
    the first elastic body and the second elastic body presenting different elastic behaviors, wherein a damping of the first elastic body in a first radial direction relative to a link axis is greater than a damping of the second elastic body in the first radial direction relative to the link axis, and a resilience of the second elastic body in a second radial direction relative to the link axis is greater than a resilience of the first elastic body in the second radial direction relative to the link axis, the method comprising:
    providing and positioning:
      the first inner armature and the first outer armature, and
      the second inner armature and the second outer armature;

molding:
the first elastic body between the first inner armature and first outer armature, so as to obtain the first sleeve, and
the second elastic body between the second inner armature and the second outer armature, so as to obtain the second sleeve; and
assembling the first sleeve and the second sleeve.

12. The method of claim 11, wherein:
the damping of the first elastic body in the first radial direction relative to the link axis is greater than the damping of the second elastic body in the second radial direction relative to the link axis.

13. The method of claim 12, wherein the damping of the first elastic body in the first radial direction relative to the link axis is greater than 1.5 times the damping of the second elastic body in the second radial direction relative to the link axis.

14. The method of claim 13, wherein
the damping of the first elastic body in the first radial direction relative to the link axis is between 0.10 and 0.24, and
the damping of the second elastic body in the second radial direction relative to the link axis is between 0.04 and 0.11.

15. The method of claim 14, wherein
the damping of the first elastic body in the first radial direction relative to the link axis is 0.14, and
the damping of the second elastic body in the second radial direction relative to the link axis is 0.07.

16. The method of claim 12, wherein the link is an elastic link for a vehicle, the first radial direction being a direction of travel of the vehicle, the second radial direction being a vertical of the vehicle.

17. The method of claim 12, wherein:
the first elastic body comprises one or more end-of-stroke stops in the second radial direction, and
the second elastic body comprises one or more end-of-stroke stops in the first radial direction.

18. The method of claim 11, wherein the first radial direction and the second radial direction are substantially orthogonal.

19. The method according to claim 11, wherein assembling the first sleeve and the second sleeve comprises implementing a means for securing the first sleeve and the second sleeve together.

20. The method according to claim 11, wherein assembling the first sleeve and the second sleeve comprises:
crimping a housing around the first sleeve and the second sleeve; and
inserting a connector into a central passage of the first inner armature and into a central passage of the second inner armature.

* * * * *